United States Patent Office 3,347,978
Patented Oct. 17, 1967

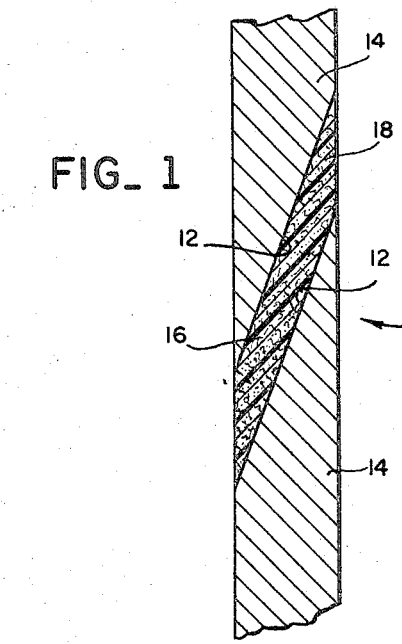
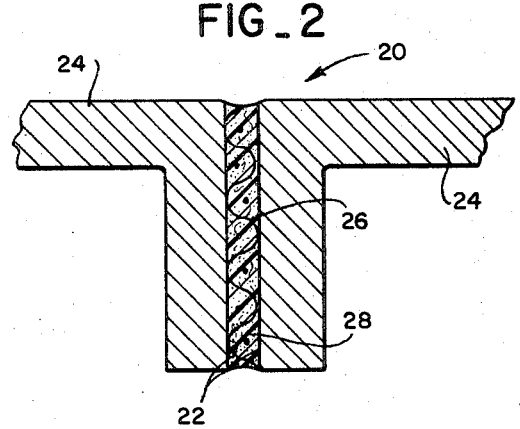
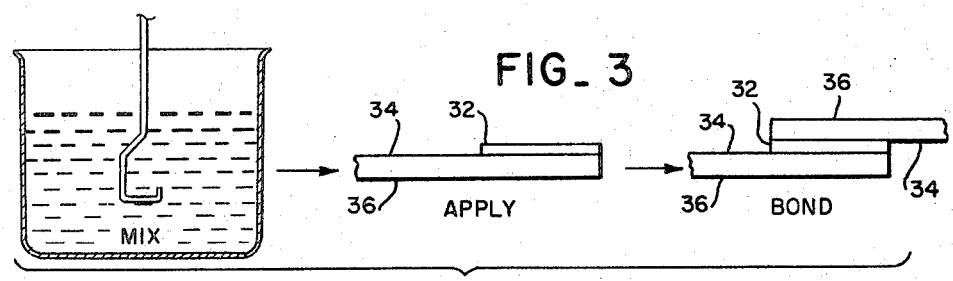
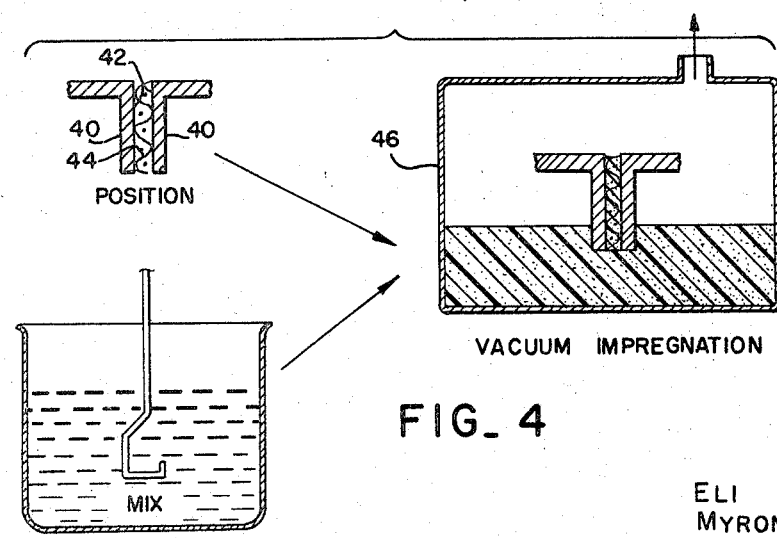
INVENTORS
ELI SIMON
MYRON LEVINE

3,347,978
ELECTRICALLY CONDUCTIVE JOINTS
AND GASKETS
Eli Simon and Myron Levine, Los Angeles, Calif., assignors to Lockheed Aircraft Corporation, Burbank, Calif.
Filed June 3, 1963, Ser. No. 284,922
5 Claims. (Cl. 174—84)

This invention pertains to new and improved electrically conductive joints.

For many years techniques such as riveting, welding and the like have been commonly used to join metal members. Because of considerations which are not necessary to the understanding of this invention it is frequently desired to bond such members utilizing an adhesive. Such adhesively bonded joints are practically always of a completely sealed character and avoid localized stresses such as are encountered in riveted and similar joints. When desired, materials having different properties such as different coefficients of expansion can be joined by adhesives.

In the utilization of adhesive joints in certain fields such as the missile and aircraft field a significant problem has been encountered. Riveted, welded and other related type joints such as have previously been used in this field are of an electrically conductive character, and as a consequence of this they have provided a means for bleeding off static and other charges so as to, in effect, "ground" such charges. Adhesive bonds in a joint are practically always of a dielectric character. As a consequence of this, it has not been desirable to use adhesive bonds in many applications in the aircraft and missile field and in other fields because of the difficulty of shorting out or electrically connecting the parts connected by such bonds. However, while the adhesives described herein are generally preferred it will be understood that the invention is not so limited, other materials having sealant characteristics being equally acceptable in numerous joint applications.

An object of the present invention is to provide new and improved electrically conductive adhesive joints. A closely related object of this invention is to provide adhesive bonding compositions which can be used so as to create an adhesive bond between electrically conductive members so as to avoid the problem of accumulation of charges briefly indicated in the preceding paragraph. Another object of this invention is to provide joints or bonds as herein indicated which are relatively simple to create, which are relatively inexpensive, and which are capable of giving satisfactory performance in practically any application and which may be either bonded to the receiving surfaces or interposed therebetween as a gasket. A further object of this invention is to provide processes for creating such joints or bonds which are relatively simple to carry out at a comparatively nominal cost.

These and various other objects of this invention as well as many specific advantages of it will be apparent from a detailed consideration of the remainder of this specification, the appended claims and the accompanying drawing in which:

FIGURE 1 is a cross-sectional view indicating an electrically conductive adhesive joint of this invention;

FIGURE 2 is a cross-sectional view showing a modified electrically conductive adhesive joint of this invention;

FIGURE 3 is a schematic view indicating one process for creating an electrically conductive joint such as either of the joints shown in the preceding figures; and FIGURE 4 is a schematic view indicating a modified process for creating an electrically conductive joint such as either of the joints shown in the initial figure of the drawing.

From a careful consideration of the drawing, those skilled in the adhesive bonding field, and in particular the field pertaining to the use of adhesives in bonding structural metals, although the invention is not so limited, will realize that the features or principles of this invention can be utilized in virtually an indeterminate number of differently appearing and differently constructed joints. For this reason, the accompanying drawing is not to be considered as limiting or restricting the inventive features or principles summarized in the appended claims forming a part of this disclosure.

As an aid to understanding this invention it can be stated in essentially summary form that it concerns electrically conductive joints in which first and second metallic surfaces are separated from one another by a mass of electrically conductive fibers located so as to electrically connect these surfaces.

The character of electrically conductive joints of the present invention is best more fully explained by referring to the accompanying drawing. In FIGURE 1 of the drawing there is shown a joint 10 of the present invention which is used so as to electrically and physically connect surfaces 12 of two electrically conductive metal parts 14. These surfaces 12 in the joint 10 are located so as to be spaced parallel to one another and so as to be located adjacent to one another.

The space between these surfaces 12 is filled with a mass of overlapping electrically conductive fibers 16. At least some of the fibers 16 are in direct contact with each of the surfaces 12; some of the fibers 16 are in direct contact with one another between the surfaces 12. By virtue of the fibers 16 extending in this manner an electrical connection is established between the surfaces 12 of the members 14 and the joint 10.

This electrical connection is maintained by a matrix material, usually an adhesive 18, which surrounds all of the fibers 16 and which is in contact with and bonded to the surfaces 12. Preferably the adhesive 18 completely fills the spaces around the fibers 16 between the surfaces 12 so that the joint 10 is of a substantially void free character. The adhesive 18, in the preferred condition, is at least bonded to these surfaces 12; preferably it is also bonded to the fibers 16. If it is not bonded to the fibers 16 it will still serve to hold these fibers 16 in position by surrounding them.

An important aspect of the present invention is the fact that the joint 10 may be created utilizing a wide variety of different materials. The adhesive 18 used in this joint may be of virtually any desired character or type capable of bonding to the surfaces 12. The precise matrix material used in a joint such as the joint 10 will vary depending upon the use of the particular joint. Suitable adhesives for different purposes are well known at the present time, and those skilled in the adhesive art will have no difficulty in selecting a particular adhesive for a particular application.

Particularly satisfactory results can be achieved using as the adhesive 18 adhesives such as are conventionally utilized for structural metal bonding. Such adhesives are enumerated in detail in Chapter 44 entitled, "Structural Metal Bonding," of the text Handbook of Adhesives, edited by Skeist, published by Rheinhold Publishing Company, New York, copyright 1962. The entire disclosure of this chapter is incorporated herein by reference.

From an examination of this chapter of this text it will be obvious that a large number of different, known phenolic resins or phenolic resins modified by the addition of rubber, vinyl or epoxy resins can be used in joints such as the joint 10. Further, various known nitrile rubber, neoprene, vinyl, vinyl acetate-vinyl chloride copolymers, polyvinyl butyral, polyolefins (polyethylene;

polypropylene, etc.), epoxy, polysulfide, carboxylic, resorcinol, amino, isocyanate-based (polyurethane), cyanoacrylate, polyamide, polyester, silicone and related adhesives can be utilized in an electrically conductive adhesive joint of this invention. Various of these materials are capable of being precast as adherent or non-adherent gasketing materials for selective use as such.

Further, compatible adhesives such as are referred to as high and low modulus materials having different properties can be utilized in combination with one another as the adhesive 18 in a joint such as the joint 10. Such a material can be of a category capable of being applied from a hot melt, or can be of a category capable of being cured so as to create a final bond by the application of heat, pressure, heat and pressure, and/or a catalyst which is effective either at room or at an elevated temperature.

The adhesive system utilized can contain limited amounts of secondary ingredients such as known plasticizers which are used in order to impart a restricted amount of flexibility to an adhesive or various known fillers such as are commonly used in order to adjust coefficients of expansion or to provide pigmentation or to achieve other purposes. Such plasticizers and fillers are extremely well known at the present time and are indicated in texts such as the aforegoing Ekeist text "Handbook of Adhesives."

In determining whether or not various known plasticizers or fillers should be utilized in an adhesive joint such as the joint 10 care must be taken in determining the properties designed in the joint and the effect of such secondary materials and the metal fibers 16 on the strength of the joint. If too great a quantity of such secondary ingredients and/or metal fibers is present the amount of adhesive present in the joint will be reduced to such an extent that desired strength characteristics are not achieved. In general the decision as to whether or not any of secondary materials such as plasticizers and fillers can be used is made after first establishing whether an adhesive is indeed required, and then establishing the quantity of fibers 16 necessary to establish the desired degree of electrical conduction in a joint such as the joint 10. It is then determined whether or not such secondary material can beneficially be employed in the adhesive 18.

The amount of metal fiber 16 used in a joint such as the joint 10 in order to achieve a desired electrical resistance across this joint will depend upon a number of factors. The quantity of metal fiber present is, of course, important in this regard. The size and electrical conductivity of these fibers is also important. Related to these factors is the amount and degree to which the metal fibers contact the surfaces 12 and one another. The resistance in a joint such as the joint 10 is also related to the character of the surfaces of the metal fibers. If these fibers are of such a character as to present a significant surface resistance where they contact one another or the surfaces 12 the resistance of a joint such as the joint 10 will be higher than if the fibers are capable of abutting against one another so as to establish a relatively low resistance contact.

These latter factors are considered important in distinguishing the results achieved with the present invention. It is well known to place electrically conductive particles or flakes such as carbon particles, silver flakes and the like in a resinous binder having adhesive properties. In order for such a composition to have a significant conductivity it must contain a comparatively large quantity of such particles so that the particles can overlap and contact one another so as to establish an electrical path. Frequently when such a proportion of conductive particles is used the physical properties of the composite composition are lowered to a point sufficient to destroy the usefulness of such a composition for various purposes such as an adhesive bonding material.

This type of consequence is avoided with the present invention because of the inherent nature and character of the metal fibers used. These fibers, being comparatively long, tend to overlap and to extend a significant distance within the adhesive 18 used in the joint 10. As a result of this, the number of contact points between the metal fibers 16 and the surfaces 12 are much more limited in order to establish electrical conduction than the number of contact points in a conventional electrically conductive composition as indicated in the preceding paragraph.

Hence, with the present invention, it is possible to create an electrically conductive joint in which the metal fibers in the joint are proportioned as to the adhesive so that the adhesive is not detrimentally affected from a physical standpoint to an intolerable or significant degree. Thus, electrically conductive joints as herein described use less metal to establish an electrically conductive path of a given resistance than prior compositions employing conductive particles in a resinous binder. As a consequence of the comparatively small amount of metal used in the joints of this invention the physical properties of the adhesives are not "diluted" in these joints to a point where there is any need for concern.

The amount of these fibers used in a joint such as the joint 10 can be varied as indicated in the preceding discussion within comparatively wide limits. If too small a quantity of metal fibers is present in such a joint, its (the joint's) resistance is too high to achieve desired results. Satisfactory joints are considered to be possible when ½% by volume of the material within the joint proper consists of metal fibers. When the proportion of fibers within the joint proper exceeds 25% by volume normally the physical properties of the adhesive used are believed to be decreased to an undesired extent; in addition, it is considered relatively difficult to handle a mixture of this amount of fiber in an adhesive composition. These fibers preferably are from 1/10,000 in. to 20/1,000 in. in diameter. If they are smaller than this their internal resistance tends to be too high for a joint to be sufficiently conductive for normal purposes; if they are larger than indicated, they tend to be so stiff and relatively inflexible that they are difficult to handle and orient in a desired manner. Preferably these fibers should be at least as long as the thickness of the adhesive composition in a joint as herein described so as to achieve desired conductivity with a minimum of electrical contact points between fibers.

The metal fibers 16 used in the joint 10 are considered to have other significant characteristics. Because of the physical properties of various types of fibers, they can be considered as reinforcing and aiding in obtaining a bond of a desired strength, particularly when the adhesive 18 is bonded to them. In general the more uneven and non-uniform the surfaces of such fibers 16 the better an adhesive such as the adhesive 18 will adhere to them. Similarly, the more intertwined the fibers 16 the more it is believed that these fibers aid in reinforcing one another within the area of the joint 10.

In order that the electrical resistance of the joint 10 be relatively low it is, of course, preferred that the metal fibers 16 and the surfaces 12 used in a joint 10 be comparatively free from non-electrically conductive surface contamination. Any such contamination will tend to cause an increase in resistance with any given quantity of fibers 16 used in any specific joint such as the joint 10. In spite of this it is possible with the present invention to utilize metal fibers which have a comparatively minor amount of surface contamination. Thus, for example, aluminum or aluminum alloy fibers can be used together and with aluminum surfaces in a joint such as the joint 10 which is useful for many purposes even though the surfaces in a joint in which these metals are present are covered with a comparatively thin oxide coating such as would be obtained by normal air oxidation. Such aluminum oxide coatings are, of course, to be distinguished from comparatively thick aluminum oxide dielectric coatings such as are commonly used as capacitors.

In FIGURE 2 of the drawing there is shown another electrically conductive adhesive joint 20 of this invention which is similar to the joint 10 previously described. This joint 20 connects adjacent surfaces 22 of metal members 24 through the use of a layer of metal fiber fabric 26 which is compressed between the surfaces 22. This layer 26 is held in place by an adhesive 28 which is preferably bonded to both the layer 26 and the surfaces 22. The material 28 may be any of the adhesives or matrix materials indicated in the preceding. Similarly, the layer 26 may be composed of any metals such as can be used as the fibers 16 in the joint 10. The layer 26 may be either a woven or a non-woven fabric as desired.

A joint such as the joint 10 may be easily created in accordance with this invention as suggested in FIGURE 3 of the drawing. In forming a joint such as the joint 10 an adhesive such as of a type previously indicated, is first mixed with a quantity of fibers to be used in this joint. Any fillers, plasticizers, catalysts or the like to be used in the final joint should, of course, be added during the mixing step. After an intimate mixture is achieved a layer 32 of the mixture is applied to a surface 34 of a member 36 to be jointed in a joint. Next, another surface 34 of another member 36 to be present in the joint is placed on the layer 32 and the joint is created by allowing the adhesive present to become hard.

In practicing this process it is normally preferred to at least apply nominal or token pressure to the layer 32 before or as the adhesive is solidifying so as to cause the metal fibers present to contact the surfaces 34 and so as to bring them into contact with one another. If the particular adhesive used in this process is of a "hot melt" variety it should be heated during the mixing step and should be contacted by both of the surfaces 34 while it is in a hot condition. If the adhesive is of a category which sets up under heat and/or pressure such heat and/or pressure should be applied to the members 36 as the final bond or joint is being created.

Joints of this invention may also be created as indicated in the schematic manner as indicated in FIGURE 4 of the drawing. In creating such joints a matrix material is separately mixed if this is desirable or necessary because of the adhesive composition being used while at the same time the members 40 to be joined are placed so that the surfaces 42 to be connected are in direct contact with and are separated by a mass of fibers 44. Then these members and the fibers 44 are held in position while the matrix is drawn or forced into the area between the surfaces 42, as, for example, through the use of a vacuum impregnation tank 46. Where adhesive is used, after the area between the surfaces 42 is filled with adhesive, this adhesive is bonded in accordance with conventional practice. Thus, for example, if the adhesive is of a "hot melt" variety it is allowed to cool, or if it is of a heat and/or pressure sensitive variety such heat and/or pressure is applied to it.

From a consideration of these manners of creating electrically conductive adhesive joints it will be realized that the methods set forth in the preceding can be modified in order to adapt these methods for use with various different available pieces of equipment. It will also be realized that these methods can be modified in accordance with routine engineering skill in order to create joints of different sizes, shapes and the like. When it is desired that a gasket material be produced, conventional means for preparing sheets of uniform thickness may be utilized. Parting agents may also be applied to the joint surfaces in the above described procedures to facilitate removal of the cured materials for subsequent gasket uses.

One major advantage to the present invention is the fact that it is not limited to specific metals such as commonly are employed in electrically conductive inks and the like. By virtue of the nature of joints such as the joints 10 and 20 these joints can be created using various types of metal fibers to connect different or dissimilar metals without any significant danger of galvanic or similar corrosive action affecting these joints. This is a consequence of the fact that the metal fibers within these joints are completely encased within or sealed within the adhesive employed so that influences necessary to conventional electrolytic action are excluded from the metal fibers. Even in those cases where there is danger of water or the like causing electrolytic or similar action this danger can be minimized by choosing metals to be present within the joint which are the same or are closely positioned to one another in the electromotive series.

*Example I*

As an example of this a joint such as the joint 10 can be created so as to be approximately 1/16 in. thick using a mixture of 4 parts by weight of fine, hair-like aluminum fibers having a diameter of approximately 0.003 in. and an average length of approximately 3/8 in. and 20 parts by weight of a conventional epoxy adhesive as shown on p. 225 of the Lee and Neville text "Epoxy Resins" published by McGraw-Hill Co., Inc., copyright 1957, to join an overlapped area of 4 sq. in. between aluminum sheets. The electrical resistance across a joint of this type was less than 0.05 ohm. The strength of this joint was substantially the same as an equivalent joint omitting the fibers.

*Example II*

Another joint of this type can be created bonding a 4 sq. in. overlapped area of cadmium-plated steel plates by the following steps: preparing a mixture of 22 parts by weight epoxy resin reaction product of bis-phenol A and epichlorohydrin having an average molecular weight of 350 to 400 and an epoxide equivalent of 175 to 210, 22 parts by weight of a polysulfide liquid polymer having a structural formula as given on p. 286 of the aforementioned text, Handbook of Adhesives, and having an average molecular weight of 1,000, 8 parts by weight carbon black, 2.2 parts by weight diethylamine propylamine curing agent, and 8 parts by weight stainless steel fibers of the alloy designated as 431 stainless having a diameter of approximately 0.002 in. and varying from 1/8 to 3/8 in. long; applying this mixture to the overlapped area of one plate in a layer approximately 0.031 in. thick; pressing the other plate in place without significant reduction in the layer of adhesive mixture; and then curing for 18 hours at a temperature of 50° C. A joint created in this manner had a D.C. resistance of 0.0045 ohm, an A.C. impedance at 100 kilocycles of 0.0046 ohm, and an A.C. impedance at 25 megacycles of 0.0025 ohm.

*Example III*

By substituting for the stainless steel fibers in the preceding (Example II) the same weight of silicon bronze (95% by weight Cu, 4% by weight Si, 1% by weight Mn) fibers having the same size as these stainless steel fibers a joint was obtained having a D.C. resistance of less than 0.001 ohm.

*Example IV*

A joint of this invention created using 2 parts by weight of bronze fibers as specified in Example III in bonding 2 sheets of magnesium as indicated in Example II instead of the steel plates indicated in this Example II had a D.C. resistance of 0.003 ohm.

*Example V*

A joint of this invention created using 2 parts by weight of bronze fibers as specified in Example III in bonding 2 sheets of aluminum as indicated in Example II instead of the steel plates indicated in this Example II had a D.C. resistance of 0.006 ohm.

Example VI

By substituting for the stainless steel fibers in Example II 0.4 part by weight of bronze fibers as specified in Example III a joint was obtained having a D.C. resistance of 0.014 ohm.

Example VII

A joint of this invention can be created by separately mixing the following mixtures:

| Mixture | Parts by Weight | Component |
| --- | --- | --- |
| A | 25 | Polysulfide liquid polymer as specified on page 286 of the aforementioned text Handbook of Adhesives having an average polymer weight of 4,000. |
|  | 12.5 | Methyl phthalyl glycollate. |
|  | 0.25 | Stearic acid (triple pressed). |
|  | 4 | Carbon black. |
|  | 8 | 431 alloy stainless steel fibers, 0.002 in. diameter, ⅛ to ⅜ in. long. |
| B | 37.5 | Lead peroxide. |
|  | 30 | Dibutyl phthalate. |
|  | 1.5 | Stearic acid (triple pressed). |

A blend was created using 7.7 parts by weight of mixture A and 1 part by weight of mixture B, and this blend was applied to a 4 sq. in. area on a cadmium plated steel plate approximately 0.031 in. thick. Another similar plate was brought into contact with this plate and pressed slightly so as to not decrease the thickness of the adhesive to any noticeable extent. The mixture between the plates was then allowed to cure. A joint created in this manner had a D.C. resistance of 0.048 ohm and an electrical impedance at 100 kc. of 0.060 ohm.

Known neoprene, polyurethane, phenolic, silicone, polyester, polyamide, polyvinyl ether, polyvinyl butyral and related and similar adhesive mixtures can be used in joints such as are set forth in the preceding examples. Such compositions can be used in bonding virtually any conductive metal surfaces through the use of virtually any type of electrically conductive fiber.

From a careful consideration of this specification particularly those skilled in the adhesive bonding field will realize that the joints herein described are relatively simple, effective structures capable of giving satisfactory performance for their intended purposes. They will further realize that such joints may be easily and conveniently created using processes as herein described. Because of the nature of the present invention it is to be considered as being limited solely by the appended claims forming a part of this disclosure.

We claim:

1. An adhesively bonded electrically conductive joint which comprises:
    a. first and second metallic surfaces located parallel to and spaced from one another;
    b. a mass of separate, uncoated, and elongated electrically conductive fibers located between said surfaces, said fibers being discontinuous and randomly oriented, at least some of said fibers being in direct electrically conductive contact with each of said surfaces and in similar contact with one another so as to electrically connect said surfaces; and
    c. an adhesive dielectric matrix extending around said fibers and between said surfaces to form an adhesive bond therebetween.

2. An electrically conductive adhesive joint which comprises:
    a. first and second metal members having surfaces located parallel to one another, said surfaces being spaced from one another;
    b. an adhesive composition bonded to each of said surfaces, said adhesive composition extending between said surfaces and physically connecting said members; and
    c. a mass of separate, discrete and uncoated electrically conductive metal fibers randomly oriented and at least some of said fibers being of a length greater than the distance between said surfaces, and located within said adhesive composition, at least some of said fibers being in direct electrically conductive contact with each of said surfaces and in contact with one another so as to electrically connect said members.

3. An electrically conductive adhesive joint as defined in claim 2 wherein said fibers and said members are electrochemically inert with respect to one another.

4. An electrically conductive gasket which comprises:
    a. an adhesive dielectric matrix material conformed to a desired gasket shape for filling a space and relatively sealing between two spaced-apart parallel surfaces; and
    b. a mass of electrically conductive fibers contained within said matrix material in contact with one another and extending to and exposed at the surfaces of said material so as to provide electrical paths between such surfaces, at least some of said fibers being of a length exceeding the thickness of said gasket.

5. The electrically conductive gasket of claim 4 wherein the quantity of fibers utilized in said gasket is between approximately ½% and 25% of the volume of said gasket.

References Cited

UNITED STATES PATENTS

| | | |
| --- | --- | --- |
| 2,084,523 | 6/1937 | Crawford. |
| 2,477,267 | 1/1949 | Robinson _____ 174—35.2 |
| 3,140,342 | 7/1964 | Ehrreich et al. _____ 174—35 |

OTHER REFERENCES

Wanisch et al.: German printed application 1,065,052, Sept. 10, 1959.

Ulbricht: German printed application 1,073,055, Jan. 14, 1960.

DARRELL L. CLAY, *Primary Examiner.*

JOHN P. WILDMAN, JOHN F. BURNS, LARAMIE E. ASKIN, *Examiners.*